(12) United States Patent
Rupp

(10) Patent No.: US 8,165,246 B1
(45) Date of Patent: Apr. 24, 2012

(54) TRAINING SEQUENCE FOR LOW LATENCY LMS IMPLEMENTATION

(75) Inventor: Markus Rupp, Nieuwegein (NL)

(73) Assignee: Alcatel Lucent, Paris (FR)

( * ) Notice: Subject to any disclaimer, the term of this patent is extended or adjusted under 35 U.S.C. 154(b) by 604 days.

(21) Appl. No.: 09/648,983

(22) Filed: Aug. 28, 2000

(51) Int. Cl.
H04L 27/14 (2006.01)
H04L 27/22 (2006.01)

(52) U.S. Cl. .................... 375/326; 375/277; 375/288

(58) Field of Classification Search .................. 375/137, 375/148, 149, 316, 326, 130, 141, 343, 134, 375/147, 367, 143, 145, 140; 370/335, 350, 370/320, 515, 514, 206
See application file for complete search history.

(56) References Cited

U.S. PATENT DOCUMENTS

| | | | | |
|---|---|---|---|---|
| 4,374,412 A * | 2/1983 | Schaffner | 718/100 |
| 4,977,599 A * | 12/1990 | Bahl et al. | 704/256 |
| 5,450,456 A * | 9/1995 | Mueller | 375/224 |
| 5,732,113 A * | 3/1998 | Schmidl et al. | 375/355 |
| 5,787,223 A * | 7/1998 | Faryar et al. | 386/232 |
| 5,961,463 A * | 10/1999 | Rhyne et al. | 600/458 |
| 6,113,545 A * | 9/2000 | Chiao et al. | 600/447 |
| 6,141,567 A * | 10/2000 | Youssefmir et al. | 455/562.1 |
| 6,473,467 B1 * | 10/2002 | Wallace et al. | 375/267 |
| 6,526,091 B1 * | 2/2003 | Nystrom et al. | 375/142 |
| 6,567,482 B1 * | 5/2003 | Popovic' | 375/343 |
| 6,665,308 B1 * | 12/2003 | Rakib et al. | 370/441 |
| 6,816,879 B1 * | 11/2004 | Kiritzov et al. | 709/200 |
| 6,934,720 B1 * | 8/2005 | Jacobs et al. | 1/1 |
| 6,956,818 B1 * | 10/2005 | Thodiyil | 370/230 |
| 7,372,894 B2 * | 5/2008 | Rached et al. | 375/148 |
| 2003/0018261 A1 * | 1/2003 | Bae | 600/447 |
| 2003/0125628 A1 * | 7/2003 | Song et al. | 600/447 |

OTHER PUBLICATIONS

Pekka A. Ranta, Ari Hottinen and Zhi-Chun Honkasalo; "Co-Channel Interference Cancelling Receiver for TDMA Mobile Systems"; IEEE 1995, pp. 17-21.*

(Continued)

*Primary Examiner* — Khanh C Tran
*Assistant Examiner* — Qutbuddin Ghulamali
(74) *Attorney, Agent, or Firm* — E. J. Rosenthal

(57) ABSTRACT

Use of a training sequence having terms that are orthogonal to each other are employed to considerably speed up execution of the LMS algorithm. Such orthogonal sequences are developed for a channel that is described as a finite impulse response (FIR) filter having a length $M_{new}$ from the already existing orthogonal training sequences for at least two channels that have respective lengths $M_{old1}$ and $M_{old2}$ each that is less than $M_{new}$ such that the product of $M_{old1}$ and $M_{old2}$ is equal to $M_{new}$ when $M_{old1}$ and $M_{old2}$ have no common prime number factor. More specifically, a set of initial existing orthogonal training sequences is found, e.g., using those that were known in the prior art or by performing a computer search over known symbol constellations given a channel of length M. Thereafter, an orthogonal training sequence of length $M_{new}$ is developed, where the product of $M_{old1}$ and $M_{old2}$ is equal to $M_{new}$ by repeating the training sequence old1 $M_{old2}$ number of times to form a first concatenated sequence and repeating the training sequence old2 $M_{old1}$ number of times to form a second concatenated sequence, so that both the first concatenated sequence and the second concatenated sequence have the same length. Each term of the first concatenated sequence is multiplied by the correspondingly located term in the second concatenated sequence which is placed in the same location in a new sequence made up of the resulting $M_{new}$ products. This new sequence is an orthogonal sequence of length $M_{new}$.

7 Claims, 1 Drawing Sheet

OTHER PUBLICATIONS

G. David Forney, Jr.; "Maximum-Likelihood Sequence Estimation of Digital Sequences in the Presence of Intersymbol Interference"; IEEE Transactions on Information Theory, vol. IT-18, No. 3, May 1972, pp. 363-378.*

Chao, Tzy-Hong S., "Multi-Path Equalization for NTSC Video by Using Digital IIR Filter," IEEE Transactions on Consumer Electronics, vol. 34, No. 1, Feb. 1988, pp. 268-278.*

European Patent Office Search Report, Application No. 01302240.5-1237, The Hague, Aug. 15, 2001.

Dinan, Jappari: "Spreading codes for direct sequence DMA and wideband CDMA cellular networks" IEEE Communications Magazine, vol. 36, No. 9, Sep. 1998, pp. 48-54.

"Proposal for RACH preambles" Report of TSG-RAN Working Group 1 Meeting #6 'Online! Aug. 7, 1999.

* cited by examiner

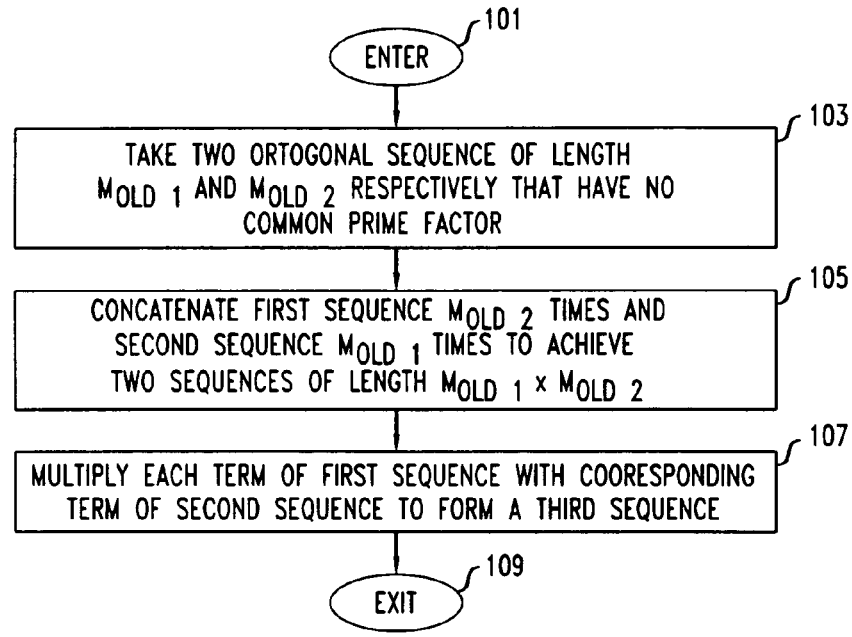
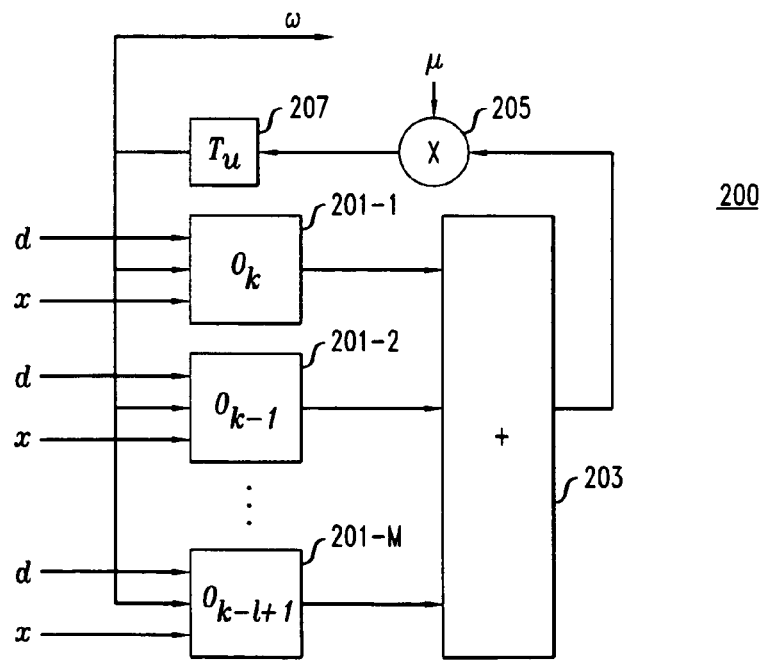

TRAINING SEQUENCE FOR LOW LATENCY LMS IMPLEMENTATION

TECHNICAL FIELD

This invention relates to the art of training a receiver that receives signals from a channel that introduces noise and intersymbol interference, and in particular, to a system of generating the training sequence so that training may be performed using the least mean squares (LMS) algorithm with low latency.

BACKGROUND OF THE INVENTION

A problem in the art of training a receiver that a) receives signals from a channel that introduces noise and intersymbol interference and b) which uses the least mean squares (LMS) algorithm, is that the high speed of computation required to perform the LMS algorithm limits the transmission rate for data. Therefore, the prior art uses a small step size so that the computation is approximately the same as if the elements of the training sequence were orthogonal. However, this approach leads to a coarser channel estimate, and the training takes longer than is desirable due to the small step size.

SUMMARY OF THE INVENTION

I have recognized that if the terms of the training sequence could actually be orthogonal to each other then the LMS algorithm can be speeded up considerably. Some orthogonal sequences have been found, but these are limited to particular conditions, e.g., certain lengths or the modulation scheme for which they could be used do not correspond to conventionally used modulation arrangements. However, there has been no method to develop training sequences that indeed have orthogonal terms given the number of weights needed to properly describe the channel as a finite impulse response (FIR) filter.

Therefore, in accordance with the principles of the invention, I have devised a process by which an orthogonal training sequence can be developed for a channel that is described as a finite impulse response (FIR) filter having a length $M_{new}$ from the already existing orthogonal training sequences for at least two channels that have respective lengths $M_{old1}$ and $M_{old2}$ each that is less than $M_{new}$ such that the product of $M_{old1}$ and $M_{old2}$ is equal to $M_{new}$ when $M_{old1}$ and $M_{old2}$ have no common prime number factor. More specifically, a set of initial existing orthogonal training sequences is found, e.g., using those that were known in the prior art or by performing a computer search over known symbol constellations given a channel of length M. Thereafter, an orthogonal training sequence of length $M_{new}$ is developed, where the product of $M_{old1}$ and $M_{old2}$ is equal to $M_{new}$ by repeating the training sequence old1 $M_{old2}$ number of times to form a first concatenated sequence and repeating the training sequence old2 $M_{old1}$ number of times to form a second concatenated sequence, so that both the first concatenated sequence and the second concatenated sequence have the same length. Each term of the first concatenated sequence is multiplied by the correspondingly located term in the second concatenated sequence which is placed in the same location in a new sequence made up of the resulting $M_{new}$ products. This new sequence is an orthogonal sequence of length $M_{new}$. If there is more than one existing orthogonal sequence for a particular length channel, e.g., there may be different orthogonal sequences for different modulation schemes for the same length channel, the implementer may choose which ever orthogonal sequence gives the results desired. Often, for practical applications, the result that yields the modulation scheme that is most suitable for use with the actual channel, which may yield the highest speeds, or the result that yields the smallest alphabet, which would reduce the hardware required for implementation, is desirable.

Advantageously, a receiver using such an orthogonal training sequence may employ the optimum step size, resulting in the fastest training.

BRIEF DESCRIPTION OF THE DRAWING

In the drawing:

FIG. 1 shows, in flowchart form, an exemplary process for developing an orthogonal training sequence in accordance with the principles of the invention; and FIG. 2 shows an exemplary receiver arranged in accordance with the principles of the invention.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows, in flowchart form, an exemplary process for developing an orthogonal training sequence can be developed for a channel that is described as a finite impulse response (FIR) filter having a length $M_{new}$ from already existing orthogonal training sequences for at least two channels that have respective lengths $M_{old1}$ and $M_{old2}$ each that is less than $M_{new}$ such that the product of $M_{old1}$ and $M_{old2}$ is equal to $M_{new}$ when $M_{old1}$ and $M_{old2}$ have no common prime number factor. The process is entered in step 101 when a new training sequence is required, e.g., when developing a new wireless communication system. Next, in step 103, two already existing orthogonal training sequences old1 and old2 for at least two channels that have respective lengths $M_{old1}$ and $M_{old2}$ each that is less than $M_{new}$ such that the product of $M_{old1}$ and $M_{old2}$ is equal to $M_{new}$ when $M_{old1}$ and $M_{old2}$ have no common prime number factor is selected. If it is not possible to find values such that the product of $M_{old1}$ and $M_{old2}$ is equal to $M_{new}$, e.g., $M_{new}$ is a prime number, then the process must terminate in an error condition. However, from a practical point of view, typically using a larger value of $M_{new}$ rather than the exact value of $M_{new}$ being sought will yield adequate results.

The initial orthogonal sequences may be obtained by performing an exhaustive search over each possible combination for a particular modulation scheme's alphabet and a given channel length to determine the existence of an orthogonal training sequence. Not all such searches will yield an orthogonal sequence, e.g., no such sequence has yet been found for a channel length of 13. Also, the time required to conduct each such searches may be quite long. Those orthogonal sequences that have been found to date are shown in Table 1. In particular, Table 1 shows exemplary orthogonal sequences and the corresponding lengths and modulation schemes for which they were found. Note that Table 1 also includes the length 4 and length 16 orthogonal sequences that were known in the prior art.

TABLE 1

| Length | Modulation Scheme | Orthogonal Sequence |
|---|---|---|
| M = 2 | QPSK | 1, − j |
| M = 3 | PAM | −2, − 2, 1 |
| M = 3 | V.29 | −3, 3 + 3j, 3 + 3j |
| M = 4 | BPSK | 1, 1, 1, − 1 |
| M = 5 | No name | 2, 2, 2, 2, − 3 |
| M = 5 | V.29 | −3 + 3j, − 3j, − 3 + 3j, 3 + 3j, 3 + 3j |
| M = 6 | PAM | −1, 1,− 1, 1, − 1, − 2 |
| M = 6 | 16QAM | −3 + 3j, − 1 + 3j, − 1 − j, 1 − 3j, − 1 + 3j, − 1 − j |
| M = 6 | V.29 | 3 − 3j, − 3, 3 − 3j, 3 + 3j, 3j, 3 + 3j |
| M = 7 | PAM | −2, − 2, − 1, 1, 1, − 2, 1 |
| M = 7 | V.29 | 1 − j, 1 − j, 1 − j, 1 − j, 1 − j, 1 − j, 5j |
| M = 8 | QPSK | 1, − j, 1, − 1, − 1, − j, − 1, − 1 |
| M = 9 | No name | 2, 2, 2, 2, 2, 2, 2, 2, − 7 |
| M = 9 | PAM | −2, − 8, 1, − 2, 1, 1, − 2, 1, 1 |
| M = 9 | V.29 | −3 − 3j, − 3 + 3j, 3, − 3 + 3j, − 3 − 3j, 3 + 3j, 3 + 3j, 3 + 3j, 3 + 3j |
| M = 10 | 16QAM | 3 − j, 3 + j, 3 − j, − 3 + 3j, 1 + 3j, − 1 − j, − 3 + j,− 1 − j, 1 + 3j, − 3 + 3j |
| M = 12 | PAM | −2,− 2, − 2, − 1, 1, − 2, − 2, 2, − 2, 1, 1, 2 |
| M = 12 | 16QAM | −3 − j, − 1 − j, 1 − j, − 1 − j, 1 + 3j, 3 − 3j, − 3 − j, − 1 − j, − 3 + 3j, − 1 − j, 1 + 3j, − 3 + 3j |
| M = 15 | PAM | 2, − 2, − 2, 1, − 2, 2, 1, 1, − 2, 1, 2, 1, 1, 1, 1 |
| M = 16 | QPSK | 1, 1, 1, 1, 1, j, − 1, − j, 1, − 1, 1, − 1, 1, − j, − 1, j |
| M = 18 | PAM | 2, − 2, 1, − 2, 1, 1, − 1, 1, 1, − 2, − 2, 1, 2, 1, 1, 1, 1 |
| M = 18 | V.29 | −3 − 3j, − 3 + 3j, 3, − 3 + 3j, − 3 − 3j, 3 + 3j, 3 + 3j, 3 + 3j, 3 + 3j, 3 − 3j, − 3 − 3j, 3j, − 3 − 3j, 3 − 3j, − 3 + 3j, − 3 + 3j, − 3 + 3j, − 3 + 3j |
| M = 19 | PAM | −2, − 2, 1, 2, − 2, 1, 1, − 2, − 2, − 2, − 2, 1, − 2, 1, − 2, 1, 1, 1, 1 |
| M = 21 | PAM | −2, 1, − 2, 1, 1, 1, 1, − 2, − 2, 1, 1, − 2, 1, 1, 1, 1, 1, 1, 1, 1, 1 |

Thereafter, in step 105, the training sequence old1 is repeated $M_{old2}$ number of times to form a first concatenated sequence. Similarly, the training sequence old2 is repeated $M_{old1}$ number of times to form a second concatenated sequence, so that both the first concatenated sequence and the second concatenated sequence have the same length which is the desired sequence length $M_{new}$. For example, if $M_{old1}$ is 3 using PAM and $M_{old2}$ is 7 using PAM a sequence with length $M_{new}$ equal to 21 can be formed. Table 2 shows the concatenated sequence formed for $M_{old1}$ being 3 using PAM and $M_{old2}$ is 7. Table 3 shows $M_{old2}$ is 7 using PAM and $M_{old1}$ being 3.

TABLE 2

| | | | | | | | | | | | | | | | | | | | | |
|---|---|---|---|---|---|---|---|---|---|---|---|---|---|---|---|---|---|---|---|---|
| −2 | −2 | 1 | −2 | −2 | 1 | −2 | −2 | 1 | −2 | −2 | 1 | −2 | −2 | 1 | −2 | −2 | 1 | −2 | −2 | 1 |

TABLE 3

| | | | | | | | | | | | | | | | | | | | | |
|---|---|---|---|---|---|---|---|---|---|---|---|---|---|---|---|---|---|---|---|---|
| −2 | −2 | −1 | 1 | 1 | −2 | 1 | −2 | −2 | −1 | 1 | 1 | −2 | 1 | −2 | −2 | −1 | 1 | 1 | −2 | 1 |

In step 107, each term df the first concatenated sequence is multiplied by the correspondingly located term in the second concatenated sequence and the resulting product is placed in the same corresponding location in a new sequence made up of the resulting $M_{new}$ products. This new sequence is an orthogonal sequence of length $M_{new}$. Table 4 shows the resulting new training sequence that is formed from the products of the terms of Tables 2 and 3, where $M_{new}$ is 21. Note that this new training sequence for $M_{new}=21$ is different than the training sequence found by computer search for M=21.

TABLE 4

| 4 | 4 | −1 | −2 | −2 | −2 | −2 | 4 | −2 | 2 | −2 | 1 | 4 | −2 | −2 | 4 | 2 | 1 | −2 | 4 | 1 |
|---|---|---|---|---|---|---|---|---|---|---|---|---|---|---|---|---|---|---|---|---|

The process then exits in step 109.

If there is more than one existing orthogonal sequence for a particular length channel, e.g., there may be different orthogonal sequences for different modulation schemes for the same length channel, the implementer may choose which ever orthogonal sequence gives the results desired. Often, for practical applications, the result that yields the modulation scheme that is most suitable for use with the actual channel, which may yield the highest speeds, or the result that yields the smallest alphabet, which would reduce the hardware required for implementation, is desirable.

Table 5 shows several additional exemplary training sequences that were obtained using the procedures of the instant invention.

TABLE 5

| M = 14 | V.29 | 1 − j, − 1 − j, 1 − j, − 1 − j, 1 − j, − 1 − j, 5j, − 1 − j, 1 − j, − 1 − j, 1 − j, − 1 − j, 1 − j, − 5 |
|---|---|---|
| M = 20 | | 2, 2, 2, − 2, − 3, 2, 2, − 2, 2, − 3, 2, − 2, 2, 2, − 3, − 2, 2, 2, 2, 3 |

FIG. 2 shows exemplary receiver 200 in accordance with the principles of the invention. Receiver 200 computes $$w_{k+1} = w_{k-1} + \mu \sum_{p=0}^{l} x^*_{k-p} e(k-p \mid k-p),$$

where X contains the M elements of the training sequence starting at time instant k−p, where k is the absolute time and p is the relative lag thereto, * means conjugate complex, and e( ) is the error using $X_{k-p}$ and W is the channel estimate. Shown in FIG. 2 are a) parallel weight computers 201, including parallel weight computers 201-1 through 201-M; b) adder 203, c) multiplier 205 and d) new weight vector producer 207.

In order to enjoy a computation efficiency over the prior art, there are at least 2 parallel weight computers 201, and there are no more than M parallel weight computers 201, where M is the channel length. Each of parallel weight computers 201 computes $x_{k-p}^* e(k-p|k-p)$. To this end, each of parallel weight computers 201 receives the training sequence X and d(k) which is the actual received symbol at time k, as well as the latest value of the weight vector W. Note that, more particularly, $e(k|k)=d(k)-x_k^T w_k$ where T means transpose. Also note that X and W are vectors while d(k) is a scalar.

Adder 203 sums the outputs of each of parallel weight computers 201, i.e., each corresponding position of the vectors that are output by parallel weight computers 201 are summed. The summation vector produced as an output by adder 203 is supplied to multiplier 205 which multiplies each element of the summation vector by the step size μ, thus scaling the summation vector by μ. The scaled summation vector is then supplied to new weight vector producer 207, which adds the scaled summation vector to the previously produced weight vector, which was stored in new weight vector producer 207, and supplies the resulting value as the new weight, as well as storing it.

Note that the orthogonal sequences referred to herein as orthogonal training sequences need not actually ever have been used for training, although typically they are suitable for use as training sequences. Furthermore, the orthogonal sequences may be used for synchronization purposes.

What is claimed is:

1. A method for forming an electromagnetic signal embodying a new orthogonal sequence, said signal being adapted for use in a channel, the channel having a length $M_{new}$, said method comprising the steps of:

selecting first and second existing orthogonal sequences old1 and old2 for at least two channels that have respective lengths $M_{old1}$ and $M_{old2}$, the product of $M_{old1}$ and $M_{old2}$ being equal to $M_{new}$ and $M_{old1}$ and $M_{old2}$ having no common prime number factor;

repeating the sequence old1 $M_{old2}$ number of times to form a first concatenated sequence;

repeating the sequence old2 $M_{old1}$ number of times to form a second concatenated sequence;

multiplying each term in said first concatenated sequence by a correspondingly located term in said second concatenated sequence;

forming said new sequence by placing each product produced in said multiplying step into a corresponding location therein; and converting said new orthogonal sequence into an electromagnetic signal representative of the information within said resulting orthogonal sequence.

2. The invention as defined in claim 1 further comprising the step of performing a search over each possible combination for a particular modulation scheme's alphabet and a given channel length to determine the existence of an orthogonal sequence for use in said selecting step.

3. The invention as defined in claim 1 wherein at least one of said first existing orthogonal sequence, said second existing orthogonal sequence, and said new orthogonal sequence is employed as a training sequence.

4. The invention as defined in claim 1 wherein at least one of said first existing orthogonal sequence, said second existing orthogonal sequence, and said new orthogonal sequence is employed as a synchronization sequence.

5. The invention as defined in claim 1 wherein first and second existing orthogonal sequences each have a length that has no common prime number factor with the other.

6. The invention as defined in claim 1 wherein said electromagnetic signal is in a modulated format suitable for wireless transmission.

7. A method for forming an electromagnetic signal embodying a new orthogonal sequence, said signal being adapted for use in a channel, the channel having a length $M_{new}$, said method comprising the steps of:

selecting first and second existing orthogonal sequences old1 and old2 for at least two channels that have respective lengths $M_{old1}$ and $M_{old2}$, the product of $M_{old1}$ and $M_{old2}$ being equal to $M_{new}$ and $M_{old1}$ and $M_{old2}$ having different lengths;

repeating the sequence old1 $M_{old2}$ number of times to form a first concatenated sequence;

repeating the sequence old2 $M_{old1}$ number of times to form a second concatenated sequence;

multiplying each term in said first concatenated sequence by a correspondingly located term in said second concatenated sequence;

forming said new sequence by placing each product produced in said multiplying step into a corresponding location therein; and converting said new orthogonal sequence into an electromagnetic signal representative of the information within said resulting orthogonal sequence.

\* \* \* \* \*